UNITED STATES PATENT OFFICE.

JESSE L. JONES, OF OAKMONT, PENNSYLVANIA, ASSIGNOR TO WESTINGHOUSE ELECTRIC AND MANUFACTURING COMPANY, A CORPORATION OF PENNSYLVANIA.

BABBITT MATERIAL.

981,767.  Specification of Letters Patent.  Patented Jan. 17, 1911.

No Drawing.  Application filed May 13, 1909.  Serial No. 495,819.

*To all whom it may concern:*

Be it known that I, JESSE L. JONES, a citizen of the United States, and a resident of Oakmont, in the county of Allegheny and State of Pennsylvania, have invented a new and useful Improvement in Babbitt Material, of which the following is a specification.

My invention relates to compositions of matter, and it has for its object to provide a novel Babbitt or bearing metal which shall be specially adapted for use as a lining for bearing boxes and for similar purposes.

When ordinary Babbitt metal is used constantly in the manufacture of bearings, the chips and turnings are usually gathered, melted and recast, but it has been observed that, under these circumstances, the new product is inferior to the original, by reason of the fact that a good deal of dirt enters into its composition.

According to my present invention, I provide a composition comprising a large percentage of chippings and turnings of ordinary Babbitt metal, the quality of which is equal or superior to Babbitt metal as usually made.

I prefer to utilize the following ingredients in the proportions indicated: lead 83–1/3 parts, tin 8–1/3 parts, antimony 8–1/8 parts, vanadium, approximately 1/4 part. The vanadium may be added in any suitable form and may vary from 1/100% to 1/2% and yet still produce the desired result. I prefer to add the vanadium in an alloy of copper containing about 30% vanadium.

I claim as my invention:

1. A composition of matter composed of a large percentage of a lead alloy and a very small percentage of vanadium.

2. A composition of matter composed of a large percentage of lead, small percentages of tin and antimony and a very small percentage of vanadium.

3. A composition of matter composed of the following ingredients in the proportions indicated: lead 83–1/3%, tin 8–1/3%, antimony 8–1/8%, vanadium, approximately 1/4%.

4. A composition of matter composed of tin, 8–1/3%; antimony, 8–1/8%; vanadium, between 1/100% and 1/2% and the remainder lead.

5. A bearing metal composed of a large percentage of scrap lead alloy and a small percentage of vanadium.

In testimony whereof, I have hereunto subscribed my name this 5th day of May, 1909.

JESSE L. JONES.

Witnesses:
 R. J. DEARBORN,
 B. B. HINES.